United States Patent Office 2,806,774
Patented Sept. 17, 1957

2,806,774

MANUFACTURE OF TUNGSTEN METAL POWDER AND ARTICLES MADE THEREFROM

Tivadar Millner and Jeno Neugebauer, Budapest, Hungary, assignors to Egyesült Izzólámpa és Villamossági Rézszrénytársaság, Budapest, Hungary, a Hungarian enterprise No Drawing. Application April 21, 1955,
Serial No. 503,022

Claims priority, application Hungary June 21, 1955

5 Claims. (Cl. 75—.5)

The present invention relates to a method of manufacturing tungsten powder and articles made therefrom, and has for its object to improve the physical properties of the powder and the mechanical characteristics of articles made therefrom.

The final crystal structure and the chemical and physical properties of metal bars manufactured by pressing and sintering tungsten powder, and of tungsten wires manufactured by swaging and drawing these rods, are markedly influenced by the traces of additives and impurities remaining in the bar after their major part has been volatilised during sintering. It is known, for example, that, besides traces of alkali and silicon, traces of aluminium remaining in tungsten bars produce a large-crystal structure and advantageous properties are obtained.

The above phenomenon is nowadays exploited in the manufacture of tungsten wires. However, owing to conditions during manufacture and working of tungsten rods, it often happens that the extremely small quantity (e. g. of the order of 0.001% or even less) of useful impurities, which is to secure the desired technological properties is not distributed evenly in, for example the single tungsten particles or through the full cross-section of the sintered tungsten rod, or, further, in the body of the tungsten wire along its length. This has the result that, although the structure of such tungsten rods is large-crystalline near the surface, in the interior it is small-crystalline, so that the rods are not homogeneous. The resultant drawn tungsten wire is more brittle at certain points than elsewhere.

We have discovered that lack of homogeneity is due to the fact that the required content of useful additives and impurities is not always distributed with a desired uniformity in tungsten, but is accumulated at certain recognised points, for example at the boundaries of crystallites or fibres. According to the present method of manufacturing tungsten metal powder from an initial material selected from the group: tungsten trioxide ($WO_3$), tungsten trioxide hydrates, ammonium tungstates in an atmosphere of hydrogen, we first reduce the initial material substantially to a stage where the ratio of tungsten to oxygen corresponds at least mainly to the ratio of tungsten to oxygen in the compound of $WO_2$, then intimately intermixing this powder in itself and finally continuing the reduction to tungsten metal powder.

The additives which promote the formation of a large-crystal structure are initially present on the surface of the original $WO_3$ grains, and it was thought that a more uniform distribution of these additives could be obtained if the reduction process were to be interrupted at an intermediate stage where at least mainly the ratio of tungsten to oxygen corresponds to the ratio of tungsten to oxygen in the compound of $WO_2$, and these particles then intimately intermixed before carrying the reduction process to completion. This was found to result in the production of tungsten rods which exhibit a large-crystal structure over their full cross-section.

In this specification, the definition "large-crystal structure over the full cross-section" is to be understood to mean that the cross-section is substantially wholly composed of crystals having a length of at least 1 mm., there being sometimes a random distribution of a few small crystals of a size of the order of 0.01 mm.

The present invention is accordingly a variation of the normal process for the production of powdered tungsten, and articles made therefrom, this variation comprising an interruption of the reduction of the initial material such as granular $WO_3$ to metal powder at an intermediate stage where, at least mainly, the ratio of tungsten to oxygen corresponds to the ratio of tungsten to oxygen in the compound of $WO_2$, and the intimate intermixing of the particles before continuing the reduction process to completion.

Not only does this process result in the desired structural characteristics of the material, but also the mechanical working such as swaging and drawing of rods manufactured in accordance with the invention is much easier and the drawn wires are more uniform than those made according to the usual procedure.

The invention is advantageously applicable not only to the reduction of $WO_3$ powder provided with surface additives for obtaining a large crystal structure, but also to those containing $ThO_2$ or only natural impurities. This is because the mixing step secures a more advantageous distribution of both artificial and natural impurities. In the latter case, the effect of the mixing step does not appear primarily in obvious differences of crystal structure but rather in better working and greater wire uniformity.

Whilst the scope of the invention is defined in the appended claims, one example of a practical embodiment thereof will now be particularly described by way of illustration only.

Tungstic acid or $WO_3$ is prepared with 0.2% $NaCl$, 0.3% $KCl$, 0.4% $SiO_2$, 0.05% $Al_2O_3$ and 0.03% $Fe_2O_3$, the particle size being mainly $\frac{1}{2}$–$1\frac{1}{2}\mu$ is partially reduced to a stage, where, at least mainly, the ratio of tungsten to oxygen corresponds to the ratio of tungsten to oxygen in the compound of $WO_2$ in a current of hydrogen at a temperature of about 700° C., whereafter the product is cooled down to about room temperature. The particle size is now 0.1–0.3$\mu$ and is fed into a mixing-drum which is rotated at a speed of 150 R. P. M. to cause intimate intermixing, then sieved and reduced to metal in an atmosphere of hydrogen at a temperature of about 820° C. Bars are pressed from the metal thus obtained and sintered electrically the current being gradually increased to approximately 92% of the current required to fuse the bar. The full cross-section of an 8 mm. diameter tungsten rod so manufactured exhibits a structure of large crystals. Manufacturing tungsten rods from the same $WO_3$ powder according to a similar method, but without the intermediate step of mixing produces only a relatively thin large-crystalline crust, the interior of the rod remaining of a fine-grained structure.

Wires drawn from tungsten rods manufactured according to the present invention suffered fewer breaks and splits during swaging and drawing, and showed more uniform physical properties, than wires drawn from rods made by the conventional process.

We claim:

1. A method of manufacturing tungsten metal powder from a starting material selected from the group consisting of tungsten trioxide ($WO_3$), tungsten trioxide hydrates, and ammonium tungstates in an atmosphere of hydrogen, which comprises reducing first the starting material substantially to a stage where the ratio of tungsten to oxygen corresponds at least mainly to the ratio of tungsten to oxygen in the compound of $WO_2$, then intimately intermixing this powder in itself and finally continuing the reduction to tungsten metal powder.

2. A method of manufacturing tungsten metal powder from a starting material selected from the group consisting of tungsten trioxide ($WO_3$), tungsten trioxide hydrates, and ammonium tungstates in an atmosphere of hydrogen, which comprises reducing first the starting material substantially to a stage where the ratio of tungsten to oxygen corresponds at least mainly to the ratio of tungsten to oxygen in the compound of $WO_2$, interrupting the reduction of the initial material at this stage, cooling, then intimately intermixing in itself and sieving the powder and finally continuing the reduction to tungsten metal powder.

3. A method of manufacturng tungsten metal powder from a starting material selected from the group consisting of tungsten trioxide ($WO_3$), tungsten trioxide hydrates, and ammonium tungstates in an atmosphere of hydrogen which comprises reducing first the starting material at least mainly to tungsten dioxide ($WO_2$)—powder, interrupting the reduction of the initial material at this intermediate stage, intimately intermixing in itself the powder and finally continuing the reduction to tungsten metal powder.

4. A method of manufacturing a tungsten body, which comprises reducing a starting material selected from the group consisting of tungsten trioxide ($WO_3$), tungsten trioxide hydrates and ammonium tungstates in an atmosphere of hydrogen to a stage where the ratio of tungsten to oxygen corresponds at least mainly to the ratio of tungsten to oxygen in the compound of $WO_2$, interrupting the reduction of the initial material at this stage, intimately intermixing in itself this powder, continuing the reduction to tungsten metal powder and forming a body from this metal powder.

5. A method of manufacturing a tungsten wire, which comprises reducing a starting material selected from the group consisting of tungsten trioxide ($WO_3$), tungsten trioxide hydrates and ammonium tungstates in an atmosphere of hydrogen to a stage where the ratio of tungsten to oxygen corresponds at least mainly to the ratio of tungsten to oxygen in the compound of $WO_2$, interrupting the reduction of the starting material at this stage, intimately intermixing in itself this powder, continuing the reduction to tungsten metal powder and forming a wire from this metal powder.

References Cited in the file of this patent

UNITED STATES PATENTS 1,130,197   Rafn _____ Mar. 2, 1915

OTHER REFERENCES

Smithells: Tungsten; published by D. Van Nostrand Co., N. Y. C., 1927; page 25.

UNITED STATES PATENT OFFICE
CERTIFICATE OF CORRECTION

Patent No. 2,806,774

September 17, 1957

Tivadar Millner et al.

It is hereby certified that error appears in the above numbered patent requiring correction and that the said Letters Patent should read as corrected below.

In the grant, lines 3 and 13, and in the heading to the printed specification, line 6, for that portion of the name of the assignee reading "Rezszrenytarsasag", each occurrence, read -- Reszvenytarsasag --; in the heading to the printed specification, line 10, for the priority date "June 21, 1955" read -- May 6, 1954 --.

Signed and sealed this 5th day of May 1959.

(SEAL)
Attest:

KARL H. AXLINE
Attesting Officer

ROBERT C. WATSON
Commissioner of Patents